US012506238B2

(12) United States Patent
Motoi

(10) Patent No.: US 12,506,238 B2
(45) Date of Patent: Dec. 23, 2025

(54) FILTER AND ANTENNA MODULE

(71) Applicant: NEC Corporation, Tokyo (JP)

(72) Inventor: Keiichi Motoi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 220 days.

(21) Appl. No.: 18/275,132

(22) PCT Filed: Jan. 11, 2022

(86) PCT No.: PCT/JP2022/000585
§ 371 (c)(1),
(2) Date: Jul. 31, 2023

(87) PCT Pub. No.: WO2022/168537
PCT Pub. Date: Aug. 11, 2022

(65) Prior Publication Data

US 2024/0106099 A1 Mar. 28, 2024

(30) Foreign Application Priority Data

Feb. 4, 2021 (JP) ................................. 2021-016337

(51) Int. Cl.
*H01Q 15/24* (2006.01)
*H01P 1/20* (2006.01)
*H01Q 23/00* (2006.01)

(52) U.S. Cl.
CPC ............... *H01P 1/20* (2013.01); *H01Q 15/24* (2013.01); *H01Q 23/00* (2013.01)

(58) Field of Classification Search
CPC .... H01P 1/16; H01P 1/161; H01P 1/20; H01P 1/208; H01P 1/2088; H01P 7/06; H01Q 15/24; H01Q 23/00
See application file for complete search history.

(56) References Cited

U.S. PATENT DOCUMENTS 4,777,459 A * 10/1988 Hudspeth .............. H01P 1/2082
333/135
5,517,203 A * 5/1996 Fiedziuszko ........... H01Q 19/17
343/756
(Continued)

FOREIGN PATENT DOCUMENTS

JP H04-082402 A 3/1992
JP H11-191703 A 7/1999
(Continued)

OTHER PUBLICATIONS

International Search Report for PCT Application No. PCT/JP2022/000585, mailed on Mar. 29, 2022.

*Primary Examiner* — Tho G Phan

(57) ABSTRACT

A filter according to the present disclosure includes input means for inputting a first polarization signal and a second polarization signal that are input from an antenna. The filter includes output means for outputting a first output signal corresponding to the first polarization signal and a second output signal corresponding to the second polarization signal, the first and the second output signals having been subjected to filter processing for making a desired frequency electric signal of each of the first and the second polarization signals pass through the first and the second output signals, respectively. The filter includes a resonator group that excites a first excitation mode and a second excitation mode perpendicular to each other by the input first and second polarization signals, whereby the output means outputs the first and the second output signals corresponding to the first and second polarization signals, respectively.

17 Claims, 16 Drawing Sheets

3

(56) References Cited

U.S. PATENT DOCUMENTS

| | | | |
|---|---|---|---|
| 6,163,237 | A | 12/2000 | Toda et al. |
| 8,836,596 | B2 * | 9/2014 | Richards ................ H01Q 15/24 343/756 |
| 11,158,918 | B2 * | 10/2021 | Li ......................... H01P 1/2053 |
| 2020/0220270 | A1 | 7/2020 | Onaka et al. |

FOREIGN PATENT DOCUMENTS

| | | | |
|---|---|---|---|
| JP | 2016-005260 | A | 1/2016 |
| WO | 2019/054063 | A1 | 3/2019 |

* cited by examiner

FILTER AND ANTENNA MODULE

This application is a National Stage Entry of PCT/JP2022/000585 filed on Jan. 11, 2022, which claims priority from JP Patent Application 2021-016337 filed on Feb. 4, 2021, the contents of all of which are incorporated herein by reference, in their entirety.

TECHNICAL FIELD

The present disclosure relates to a filter and an antenna module.

BACKGROUND ART

In recent years, an integrated-type module in which a planar antenna such as a patch antenna and a high-frequency unit of a transmitter/receiver are mounted on each of both sides of a substrate has been attracting attention in terms of reducing the size of an antenna module. In order to implement an integrated-type module, it is necessary to mount a transmitter/receiver in a region of about a half wavelength of a carrier wave, and accordingly it becomes essential to integrate a plurality of transmission/reception units including a phase shifter, a filter for improving resistance to interference waves and suppressing unnecessary emissions, and the like.

Patent Literature 1 discloses a technique related to an antenna module including a filter provided for a path of each polarization signal for a planar antenna supporting two polarizations.

CITATION LIST

Patent Literature

Patent Literature 1: International Patent Publication No. WO 2019/054063

SUMMARY OF INVENTION

Technical Problem

When a filter is individually provided for a path of each polarization signal for a planar antenna supporting a plurality of polarizations as disclosed in Patent Literature 1, a plurality of filters are required for each antenna. Accordingly, there is a problem that the number of components to be used increases and a module configuration becomes complicated.

An object of the present disclosure is to provide a filter and an antenna module for solving the above-described problem.

Solution to Problem

A filter according to the present disclosure includes: an input unit connected to an antenna, the input unit being configured to input a first polarization signal and a second polarization signal that are input from the antenna; an output unit configured to output a first output signal corresponding to the first polarization signal and a second output signal corresponding to the second polarization signal, the first and the second output signals having been subjected to filter processing for making a desired frequency electric signal of each of the first and the second polarization signals pass through the first and the second output signals, respectively; and a resonator group including a plurality of resonators, in which the resonator group excites a first excitation mode and a second excitation mode perpendicular to each other by the input first and second polarization signals, whereby the output unit outputs the first and the second output signals corresponding to the first and second polarization signals, respectively.

An antenna module according to the present disclosure includes a filter and a polarization antenna, the filter including: an input unit connected to an antenna, the input unit being configured to input a first polarization signal and a second polarization signal that are input from the antenna; an output unit configured to output a first output signal corresponding to the first polarization signal and a second output signal corresponding to the second polarization signal, the first and the second output signals having been subjected to filter processing for making a desired frequency electric signal of each of the first and the second polarization signals pass through the first and the second output signals, respectively; and a resonator group including a plurality of resonators, in which the resonator group excites a first excitation mode and a second excitation mode perpendicular to each other by the input first and second polarization signals, whereby the output unit outputs the first and the second output signals corresponding to the first and second polarization signals, respectively.

Advantageous Effects of Invention

According to the present disclosure, it is possible to provide a filter and an antenna module which enable the number of filters mounted between wires from a plurality of transmission/reception units to respective feeding points of a polarization shared planar antenna to be reduced.

EXAMPLE EMBODIMENT

Figure 1:
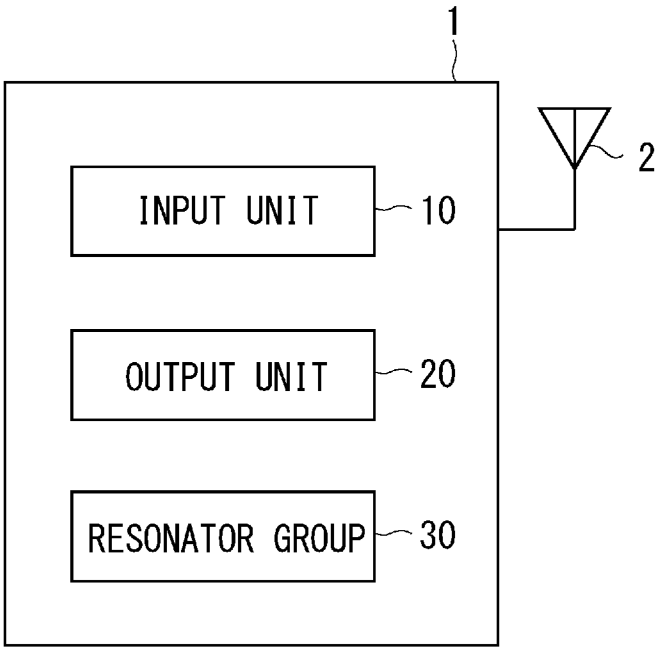
FIG. 1 is a configuration diagram of a filter according to a first example embodiment of the present disclosure.

Example embodiments will be described hereinafter with reference to the drawings. Note that since the drawings are drawn in a simplified manner, the technical scope of the example embodiments should not be narrowly interpreted based on the descriptions of the drawings. Further, the same elements are denoted by the same reference symbols, and redundant descriptions will be omitted. Note that, in some of the drawings in which a filter is viewed stereoscopically, in order to explain the positional relationship between a slot opening and an input/output line electromagnetically coupled to the slot opening, parts that cannot be visually recognized due to an antenna substrate are shown so that they can be visually recognized.

In the following example embodiments, when necessary, the present disclosure is explained by using separate sections or separate example embodiments. However, those example embodiments are not unrelated with each other, unless otherwise specified. That is, they are related in such a manner that one example embodiment is a modified example, an application example, a detailed example, or a supplementary example of a part or the whole of another example embodiment. Further, in the following example embodiments, when the number of elements or the like (including numbers, values, quantities, ranges, and the like) is mentioned, the number is not limited to that specific number except for cases where the number is explicitly specified or the number is obviously limited to a specific number based on its principle. That is, a larger number or a smaller number than the specific number may also be used.

Further, in the following example embodiments, their components (including operation steps and the like) are not necessarily indispensable except for cases where the component is explicitly specified or the component is obviously indispensable based on its principle. Similarly, in the following example embodiments, when a shape, a position relation, or the like of a component(s) or the like is mentioned, shapes or the likes that are substantially similar to or resemble that shape are also included in that shape except for cases where it is explicitly specified or they are eliminated based on its principle. This is also true for the above-described number or the like (including numbers, values, quantities, ranges, and the like).

<History of Study Until a Filter According to the Example Embodiments is Conceived>

The rapid spread of radio communication has led to a problem that there is a shortage in frequency bands used for radio communication. One of techniques for effectively using a frequency band is beamforming. Beamforming is a technique in which interference with other radio systems is prevented while signal quality is maintained by radiating radio waves having directivity, thereby enabling radio communication with a predetermined communication target.

A typical technique for achieving beamforming is phased array. Phased array is a technique for enhancing a signal in a desired direction by adjusting the phases of radio signals fed to a plurality of planar antennas in a transmitter and combining radio waves radiated from each planar antenna in space.

In recent years, an integrated-type module in which a planar antenna such as a patch antenna and a high-frequency unit of a transmitter/receiver are mounted on each of both sides of a substrate has been attracting attention in terms of reducing the size of an antenna module. It is desired that a plurality of planar antennas in the phased array be disposed at intervals of about a half wavelength of a carrier wave for spatial beamforming in which unnecessary emissions such as side lobes are suppressed. Therefore, as the frequency becomes higher, the intervals between the antennas become shorter. Consequently, the size of the above-described integrated-type module becomes small.

Giving a millimeter-wave band as an example, the half wavelength is 5 mm at 30 GHz (a wavelength of 10 mm), and the half wavelength is 2.5 mm at 60 GHz band (a wavelength of 5 mm). It is necessary to mount a transmitter/receiver in these about half-wavelength regions in order to implement an integral-type module, and accordingly it becomes essential to integrate a plurality of transmission/reception units including a phase shifter, a filter for improving resistance to interference waves and suppressing unnecessary emissions, and the like.

Polarization diversity and polarization multiple-input and multiple-output (MIMO) that use two types of polarizations perpendicular to each other may be used in order to improve communication quality. When two types of polarizations are generated simultaneously by one planar antenna, two transmission units or reception units integrated in an integrated circuit that processes polarization signals are respectively connected to two feeding points disposed at positions different from each other in the one planar antenna.

In a case in which power is fed to a two-polarization shared planar antenna, when an antenna module configuration in which a filter is individually provided for a path of each polarization signal is employed for a planar antenna supporting two polarizations as disclosed in Patent Literature 1, two filters are required for each antenna. Consequently, there is a problem that the number of components increases and a module configuration becomes complicated. In addition, when a distance between antennas becomes small as in the case of a millimeter-wave band antenna module, the volume of space around the antenna and under the antenna surface also becomes small accordingly, making it difficult to perform implementation of a filter itself. In this case, a filter having low cutoff characteristics, such as a plane transmission line type filter, e.g., a microstrip filter having, at the cost of having reduced cutoff characteristics, a lower Q value than that of a steric cavity resonator etc., may be provided. However, there is a problem that the level of flexibility in designing a line is reduced.

Therefore, a filter according to the following example embodiments which can solve the above problem has been found.

<First Example Embodiment>

A filter 1 according to this example embodiment will be described with reference to FIG. 1. FIG. 1 is a configuration diagram of the filter 1 according to this example embodiment.

The filter 1 according to this example embodiment is connected to an antenna 2. Further, the filter 1 includes an input unit 10, an output unit 20, and a resonator group 30.

The input unit 10 inputs a first polarization signal and a second polarization signal input from the antenna 2. The output unit 20 outputs a first output signal corresponding to the first polarization signal and a second output signal corresponding to the second polarization signal, which output signals have been subjected to filter processing for making a desired frequency electric signal of each of the first and the second polarization signals pass through the first and the second output signals, respectively.

The resonator group 30 includes a plurality of resonators. The resonator group 30 excites a first excitation mode and a second excitation mode perpendicular to each other by the input first and second polarization signals, whereby the output unit 20 outputs the first and the second output signals corresponding to the first and second polarization signals, respectively. Note that the first and the second polarization signals may be, for example, vertical polarization and horizontal polarization, respectively. However, the present disclosure is not limited thereto. Further, the first and the second excitation modes may be, for example, a TE 210 mode and a TE 120 mode, respectively. However, the present disclosure is not limited thereto.

According to this example embodiment, it is possible to provide a filter and an antenna module which enable the number of filters mounted between wires from a plurality of transmission/reception units to respective feeding points of a polarization shared planar antenna to be reduced.

<Second Example Embodiment>

Figure 2A:
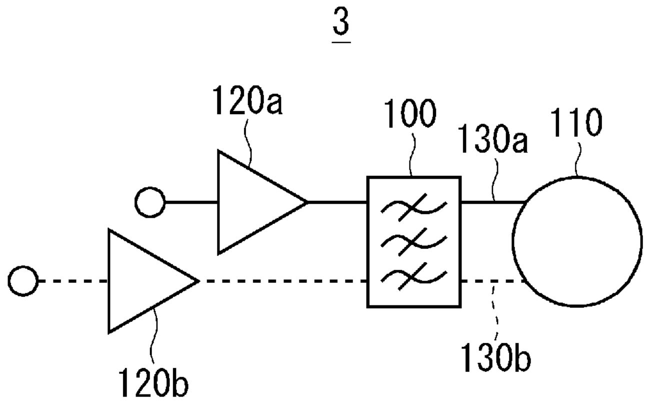
FIG. 2A is a configuration diagram of an antenna module according to a second example embodiment of the present disclosure.
Figure 2B:
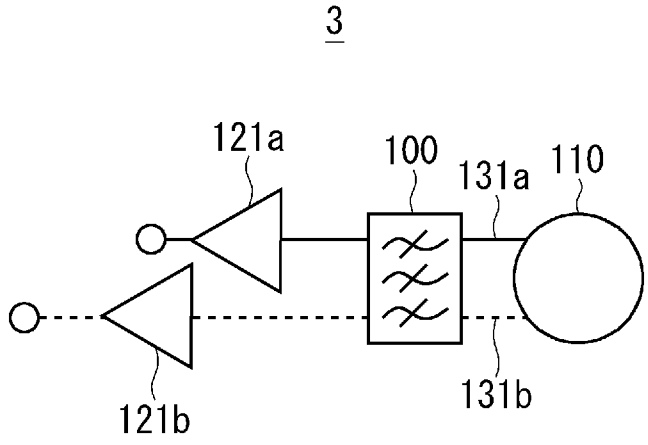
FIG. 2B is a configuration diagram of the antenna module according to the second example embodiment of the present disclosure.

A filter 100 according to this example embodiment will be described with reference to FIGS. 2A, 2B, and 3. Each of FIGS. 2A and 2B is a configuration diagram of an antenna module 3 using the filter 100 according to this example embodiment. FIG. 2A shows a configuration of the antenna module 3 during transmission, while FIG. 2B shows a configuration of the antenna module 3 during reception.

The antenna module 3 according to this example embodiment is a two-polarization shared antenna module 3 including the polarization shared filter 100. The filter 100 may have independent filter functions for each of two signal paths by maintaining isolation while sharing a housing composing a resonator.

As shown in FIGS. 2A and 2B, the filter 100 includes input/output ports as four ports. The input/output ports connect a polarization shared antenna 110 supporting two polarizations to two input/output ports provided near the antenna through feeders 130*a*, 130*b*, 131*a*, and 131*b* corresponding to each polarization. The remaining two input/output ports may be respectively connected to two pairs of transmission circuits including power amplifiers (PA) 120*a* and 120*b* for transmission, or two pairs of reception circuits including low noise amplifiers (LNA) 121*a* and 121*b* when applied for reception.

In this example embodiment, a polarization 1 and a polarization 2 are respectively assigned to signal paths. In the figures, a solid line indicates a connection relation of the main electromagnetic coupling corresponding to the polarization 1, while a dashed line indicates a connection relation of the main electromagnetic coupling corresponding to the polarization 2. Note that the polarization 1 and the polarization 2 may refer to, for example, a vertical polarization and a horizontal polarization, respectively. However, the present disclosure is not limited thereto.

Figure 3:
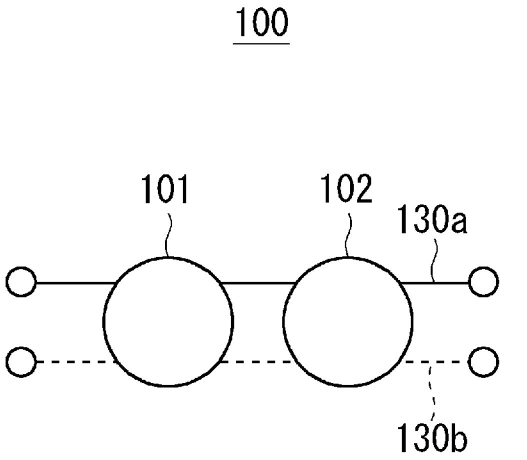
FIG. 3 is a configuration diagram of a filter according to the second example embodiment of the present disclosure.

FIG. 3 is a configuration diagram of the filter 100 according to this example embodiment. FIG. 3 shows an example of a case in which the filter 100 according to this example embodiment is composed of two resonators 101 and 102. Further, FIG. 3 shows an example of a connection relation of electromagnetic coupling between the resonators 101 and 102 of the filter 100. The feeders 130*a* and 130*b* are both connected in series in the order of the transmitter/receiver side input/output port, the resonators 101 and 102, and the antenna side input/output port. In the resonators 101 and 102, signal lines are electromagnetically coupled to the respective resonators 101 and 102 so as to excite two electromagnetic resonance modes A and B perpendicular to each other. The excitation mode A may be, for example, a TE 210 mode, and the excitation mode B may be, for example, a TE 120 mode. However, the present disclosure is not limited thereto.

Each of FIGS. 4 to 6B shows an outline of a structure of the filter 100 formed on a laminated substrate. In the following description, it is assumed that the substrate plane is the xy plane of the orthogonal coordinate system, and the substrate lamination direction is the z-axis positive direction. However, they are changed in accordance with the direction in which the filter 100 is disposed.

Figure 4:
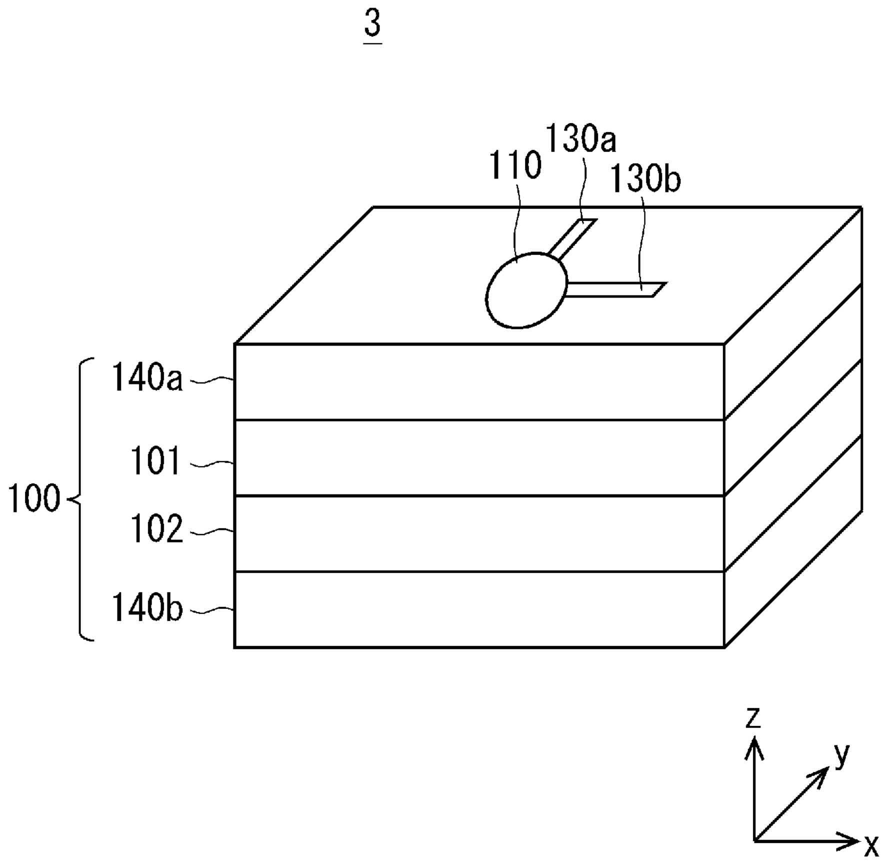
FIG. 4 is a diagram showing an outline of an overall structure of a filter formed on a laminated substrate according to the second example embodiment of the present disclosure.

As shown in FIG. 4, the filter 100 may have a lamination configuration of a substrate composed of a wiring layer 140*a*, the resonators 101 and 102, and a wiring layer 140*b*. The wiring layer 140*a* includes the antenna 110 and the input/output port of the resonator 101. The wiring layer 140*b* includes a transmission/reception circuit in the subsequent stage and the input/output port provided in the resonator 102.

A square resonator composed of a substrate integrated wall (SIW) using a via hole array (or a post) formed on a laminated substrate as an electrical boundary wall (or a post wall) may be used as the resonators 101 and 102. Further, when the resonators 101 and 102 are composed of a metal housing, a form of a cavity square resonator that includes a metal wall as an electrical boundary wall may be employed.

Figure 5A:
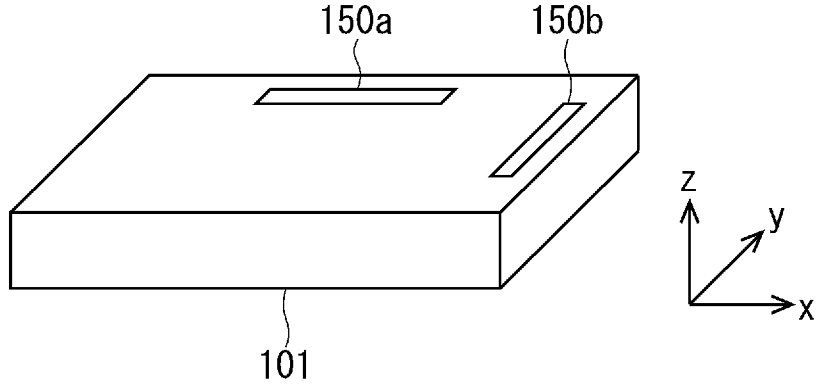
FIG. 5A is a diagram showing an outline of a structure of each layer of a filter formed on a laminated substrate according to the second example embodiment of the present disclosure.
Figure 5B:
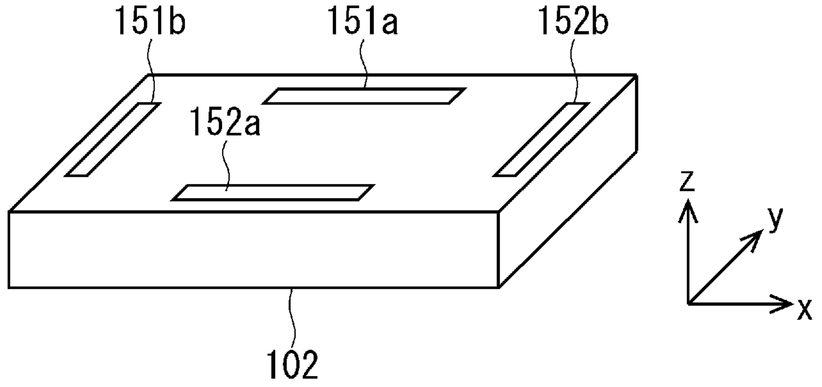
FIG. 5B is a diagram showing an outline of a structure of each layer of a filter formed on a laminated substrate according to the second example embodiment of the present disclosure.
Figure 5C:
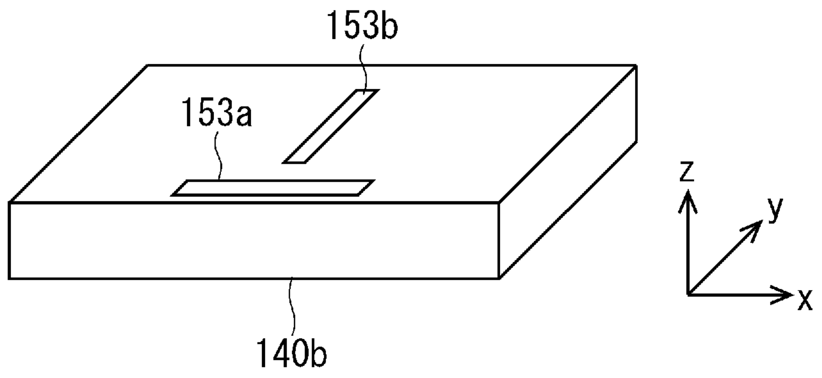
FIG. 5C is a diagram showing an outline of a structure of each layer of a filter formed on a laminated substrate according to the second example embodiment of the present disclosure.
Figure 6A:
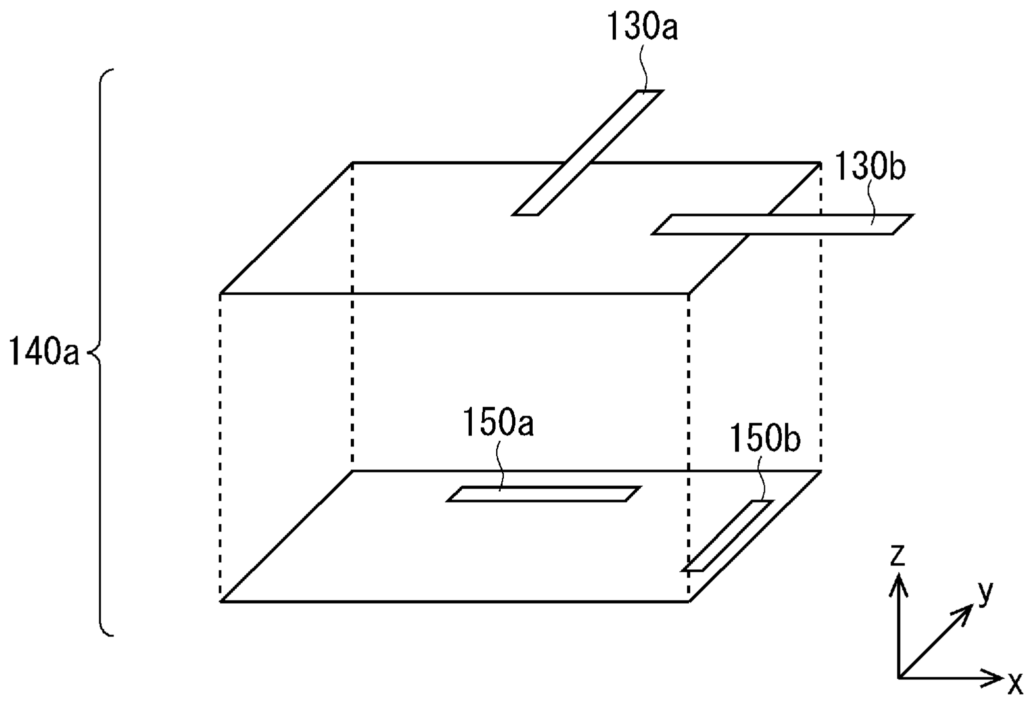
FIG. 6A is a diagram showing an outline of a structure of a wiring layer of a filter formed on a laminated substrate according to the second example embodiment of the present disclosure.

Each of FIGS. 5A, 5B, and 5C shows an outline of positions and shapes of the coupling slots provided in the resonators 101 and 102 of the filter 100 provided immediately below the antenna surface. In this example embodiment, on the upper surface of the resonator 101 close to the antenna substrate surface, rectangular slot openings 150*a* and 150*b* are provided on the top surface of a rectangular parallelepiped resonator at positions where their long sides are perpendicular to each other. As shown in FIG. 6A, the feeders 130*a* and 130*b* are respectively electromagnetically coupled to the slot openings 150*a* and 150*b*, to thereby excite different excitation modes perpendicular to each other in the resonator 101. Specifically, in a rectangular waveguide resonator including square top and bottom surfaces, the TE 210 mode and the TE 120 mode can be used for excitation modes perpendicular to each other.

Further, the rectangular slot openings 151*a*, 151*b*, 152*a*, and 152*b* for coupling between resonators are provided between the resonator 101 and the resonator 102. Each of the pair of the slot openings (151*a*, 152*a*) and the pair of the slot openings (151*b*, 152*b*) mainly contributes to the slot openings for excitation in the TE 210 mode and the TE 120 mode and to each polarization signal path. That is, when one slot opening is closed, only one excitation mode is operated and only one polarization signal propagates.

Similarly, in the resonator 102, rectangular slot openings 153*a* and 153*b* are provided on the lower surface side where the signal lines connecting the transmission/reception circuits are provided at positions where their long sides are perpendicular to each other. FIG. 5C shows an example of a case in which the slot opening 153*b* is disposed near the center of the resonator 102. However, in accordance with desired filter characteristics, it may be freely disposed, for example, near the long side like in the case of the slot opening 150*b*.

Figure 6B:
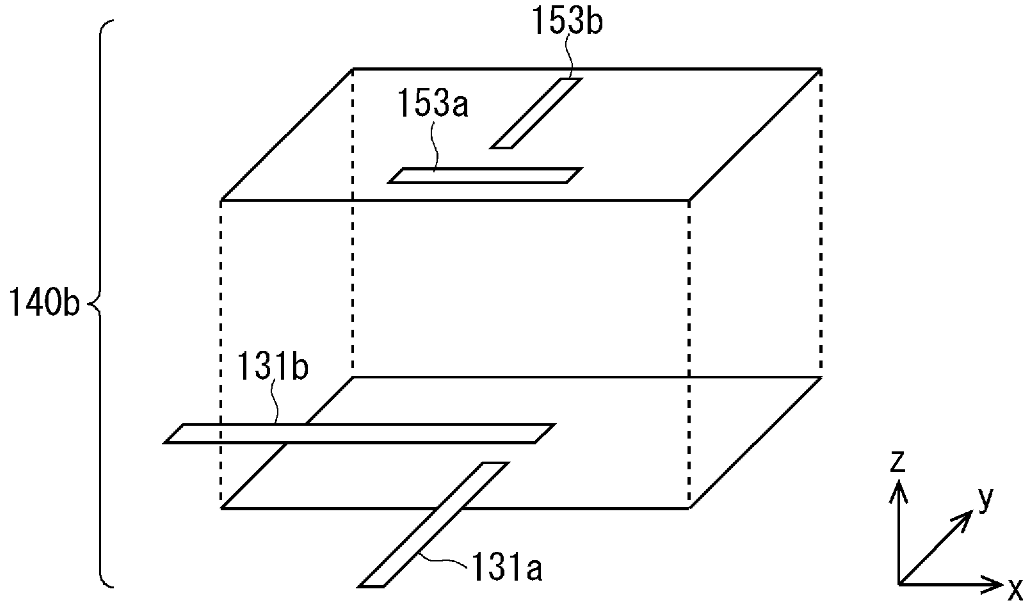
FIG. 6B is a diagram showing an outline of a structure of a wiring layer of a filter formed on a laminated substrate according to the second example embodiment of the present disclosure.

As shown in FIG. 6B, like in the case of the wiring layer 140*a*, which is the upper side of the filter 100, the feeders 131*a* and 131*b* may be provided on the lower side of the wiring layer 140*b*, and the feeders 131*a* and 131*b* may be respectively electromagnetically coupled to the slot openings 153*a* and 153*b* through the wiring layer 140*b*. At this time, different excitation modes perpendicular to each other are excited in the resonator 102. Specifically, in a square resonator including a square planar plate-like upper and lower surfaces, the TE 210 mode and the TE 120 mode can be used as excitation modes perpendicular to each other.

Each of FIGS. 7 to 10 shows a vector diagram of a standing wave mode of an electromagnetic field in the xy-cross section when the square planar plate-like resonators 101 and 102 described with reference to FIGS. 4 to 6B are composed of dielectric multilayer substrates.

Figure 7:
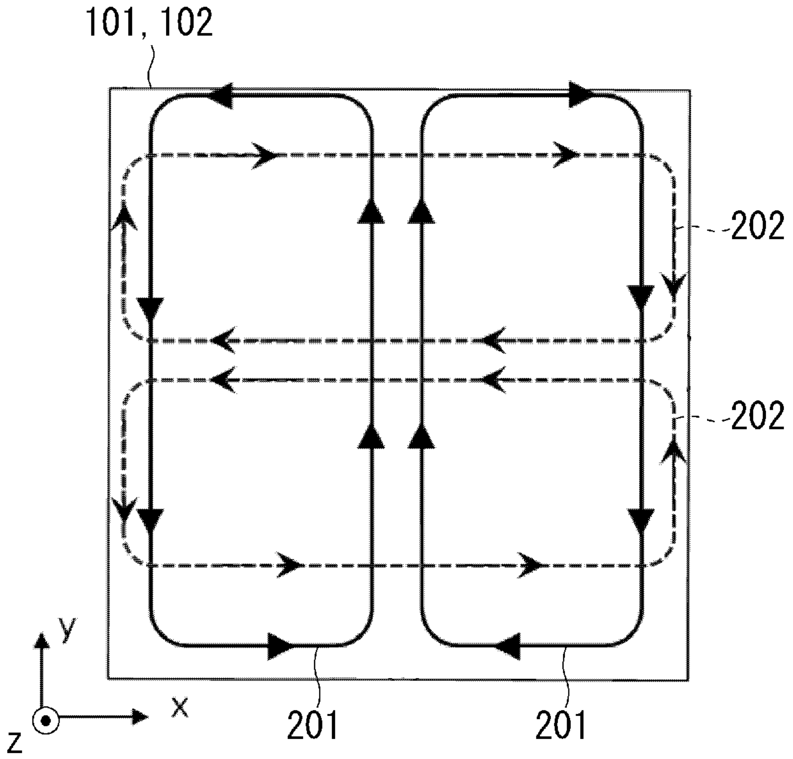
FIG. 7 is a vector diagram of a standing wave mode of a magnetic field of a resonator according to the second example embodiment of the present disclosure.

FIG. 7 shows magnetic field vectors 201 and 202 during excitation in the TE 210 mode and the TE 120 mode by using solid and dashed lines, respectively.

Figure 8A:
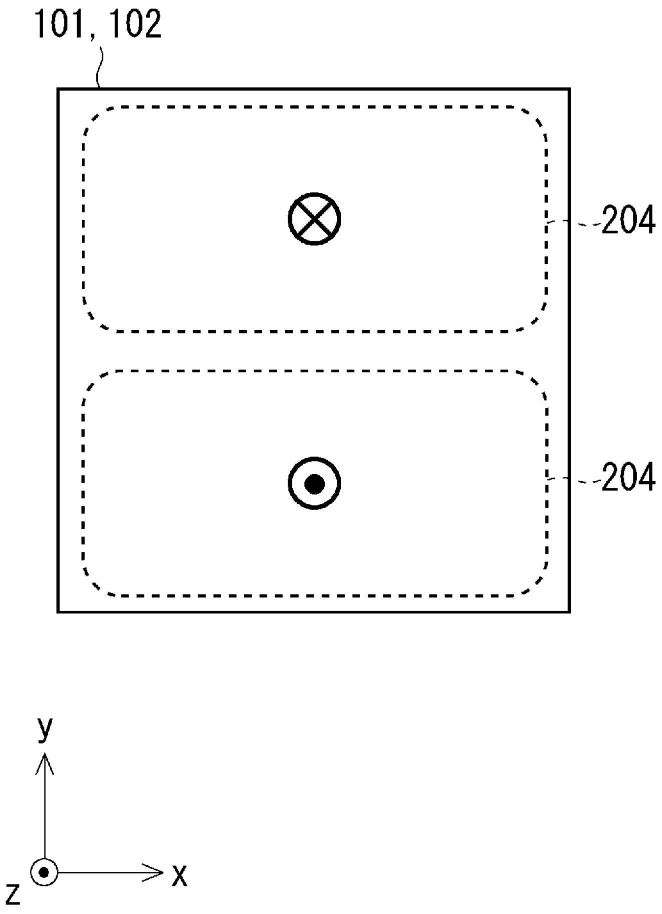
FIG. 8A is a vector diagram of a standing wave mode of an electric field of a resonator according to the second example embodiment of the present disclosure.
Figure 8B:
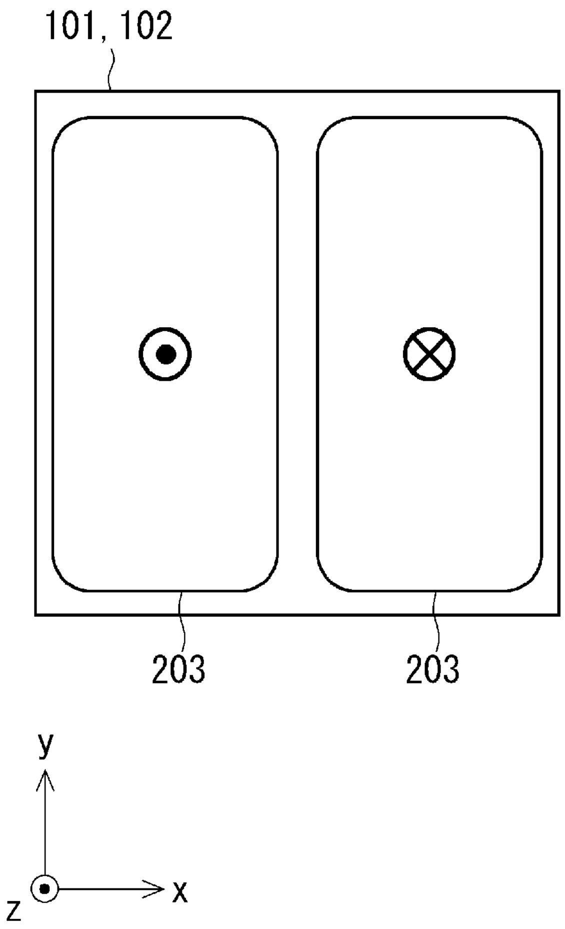
FIG. 8B is a vector diagram of a standing wave mode of an electric field of a resonator according to the second example embodiment of the present disclosure.

In each of FIGS. 8A and 8B, regions in which the directions of the electric field vectors 203 and 204 are the same direction during excitation in the TE 210 mode and the TE 120 mode are schematically shown by using solid and dashed lines, respectively, and regarding the direction of the electric field vector at any given time, the −z direction is shown by using a cross (x mark in the circle) and the +z direction is shown by using a dot (• mark). The directions of the electrolysis vector are switched at a cycle of the signal frequency.

Figure 9:
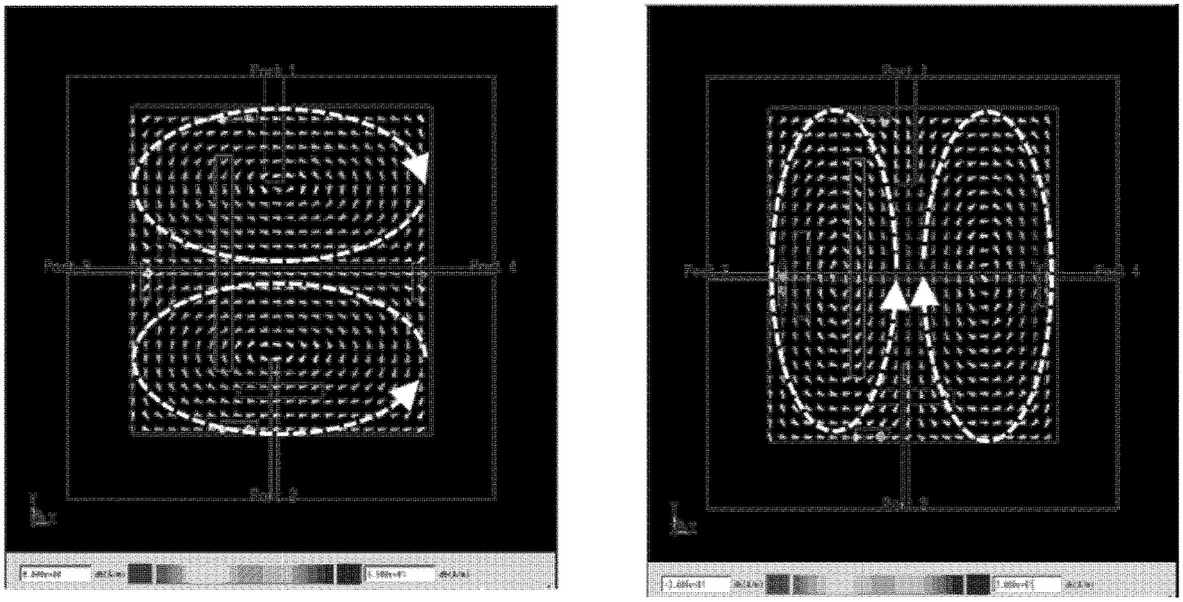
FIG. 9 is a vector diagram by a simulation of a standing wave mode of a magnetic field of a resonator according to the second example embodiment of the present disclosure.
Figure 10:
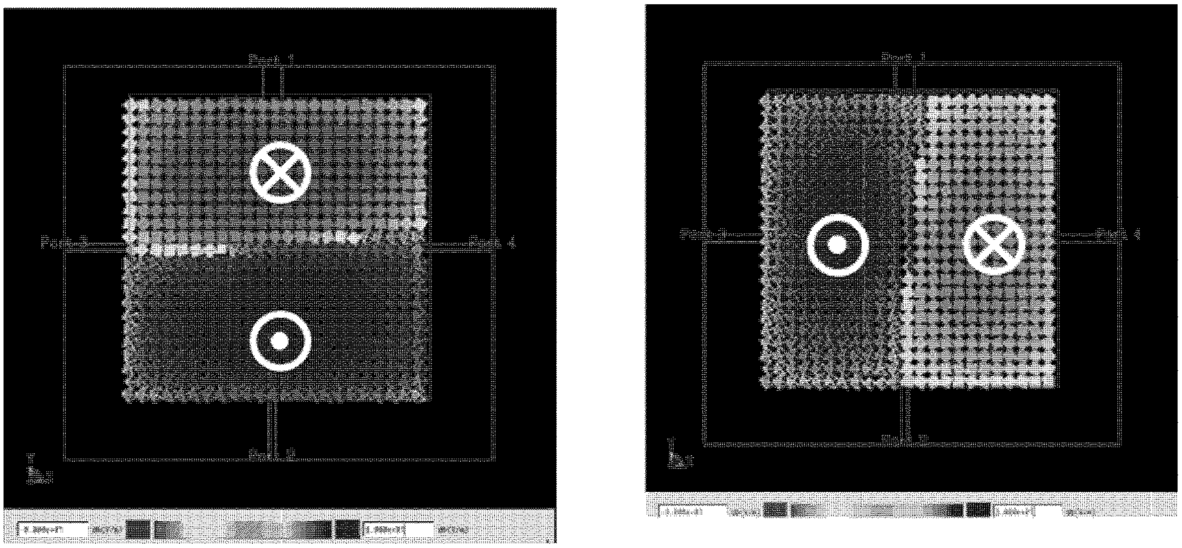
FIG. 10 is a vector diagram by a simulation of the standing wave mode of an electric field of a resonator according to the second example embodiment of the present disclosure.

FIG. 9 shows a state of the magnetic field vector during excitation in each of the TE 210 mode and TE 120 mode by an electromagnetic field simulation of a bandpass filter (BPF) according to this embodiment, which is composed of a dielectric multilayer substrate. Similarly, FIG. 10 shows a state of the electric field vector during excitation in each of the TE 210 mode and the TE 120 mode by using an electromagnetic field simulation. Both of the modes are perpendicular to each other, and by using these modes for signal transmission corresponding to each polarization, signals can be transmitted independently while maintaining high isolation.

Figure 11A:
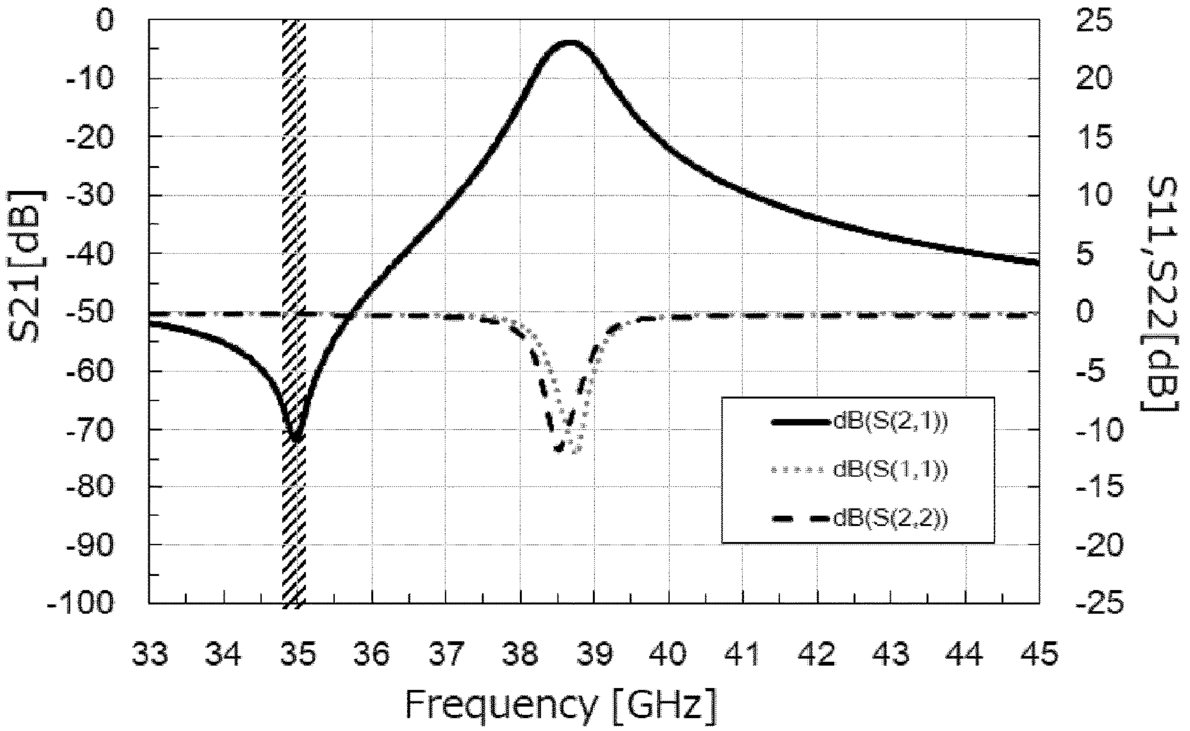
FIG. 11A is a diagram showing a result of a simulation of filter characteristics according to the second example embodiment of the present disclosure.
Figure 11B:
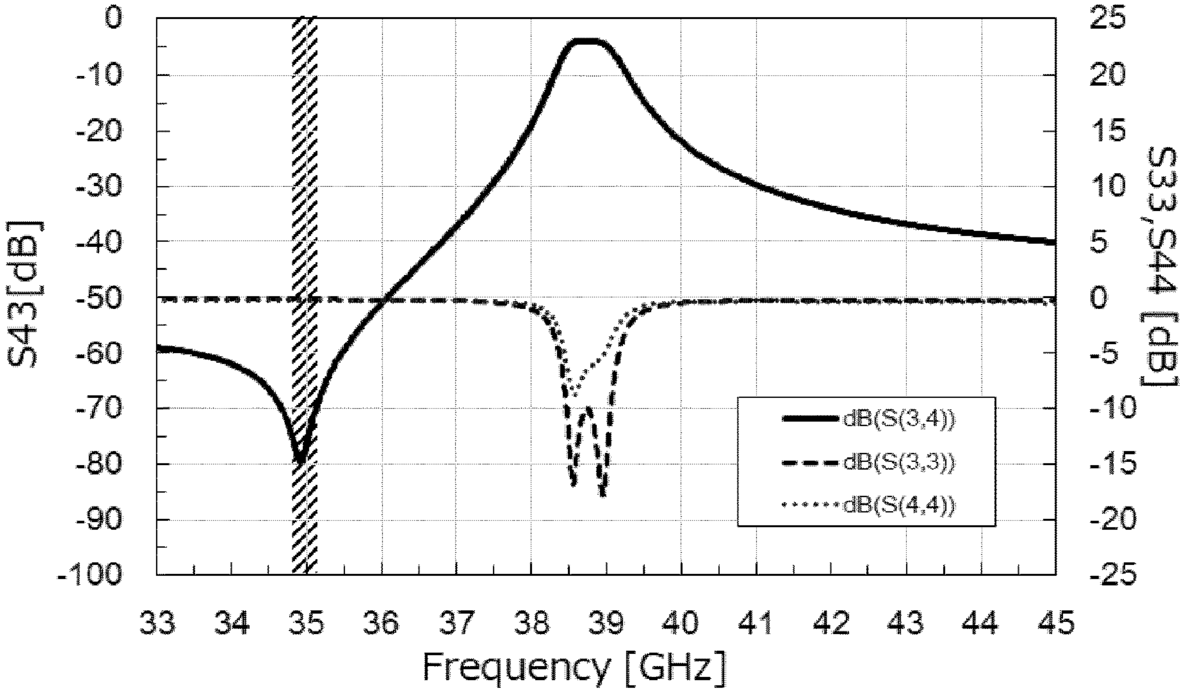
FIG. 11B is a diagram showing a result of a simulation of filter characteristics according to the second example embodiment of the present disclosure.

Each of FIGS. 11A and 11B shows a result of a simulation of the filter characteristics of each signal line in the filter structure shown in FIGS. 4 to 6B. Regarding the xy plane, the model of the resonator used in the simulation has a square shape and the length of each side thereof is a length of approximately half a wavelength or less, and regarding the lamination direction in the z-axis positive direction, the model of the resonator used in the simulation has a layer thickness of about 100 um to 200 um. These values may be changed in accordance with filter characteristics and manufacturing specifications as appropriate.

Transmission coefficients of S parameters, which are characteristics of the high-frequency circuit using the filter according to this example embodiment, are set to be S21 and S43. It is assumed that S21 is the TE 210 mode and S43 is the TE 120 mode. A simulation was performed for the transmission coefficients S21 and S43 when a passband frequency is around 39 GHz and 35 GHz is a transmission zero point, i.e., an attenuation pole.

Note that, when filter characteristics were designed, the (1+1)-order generalized Chebyshev characteristic, which explicitly indicates the assignment of one of the two orders of the filter having a two-stage resonator configuration to the order of the transmission zero point, was applied. The generalized Chebyshev characteristic is a generic term for characteristics of a bandpass filter having asymmetric pass characteristics, in which a transmission zero point asymmetric to the Chebyshev characteristic having in-band ripple characteristics is disposed.

Further, in order to make a filter include the above transmission zero point, it is necessary for the resonator group to include a separate resonator for a detour of a signal and achieve coupling between resonators, which is a so-called cross coupling. However, restrictions of the above structure are more difficult when a high integration is required, such as in the case of a millimeter-wave antenna array module.

Therefore, in this example embodiment, for signal transmission of each of the first and the second polarization signals, coupling having a frequency dependence is used, which is a technique for a filter configuration that can generate a transmission zero point while maintaining simple serial coupling without a detour being provided. Specifically, the coupling amount can be finely adjusted mainly by providing two pairs of slot openings, i.e., the pair of the slot openings 151*a* and 152*a* and the pair of the slot openings 151*b* and 152*b*, between the resonator 101 and the resonator 102.

Note that, in 5G millimeter-wave communication using 39 GHz band transmission, unnecessary waves due to a local signal leakage when a local signal is set at, for example, 35 GHz become a problem in an integrated circuit module. According to this example embodiment, since an unnecessary wave signal of a specific frequency, such as the aforementioned local signal leakage signal, can be effectively reduced in a filter outside the integrated circuit at a set transmission zero point, the present disclosure is suitably used when it is applied to a general-purpose millimeter-wave integrated circuit.

Figure 12:
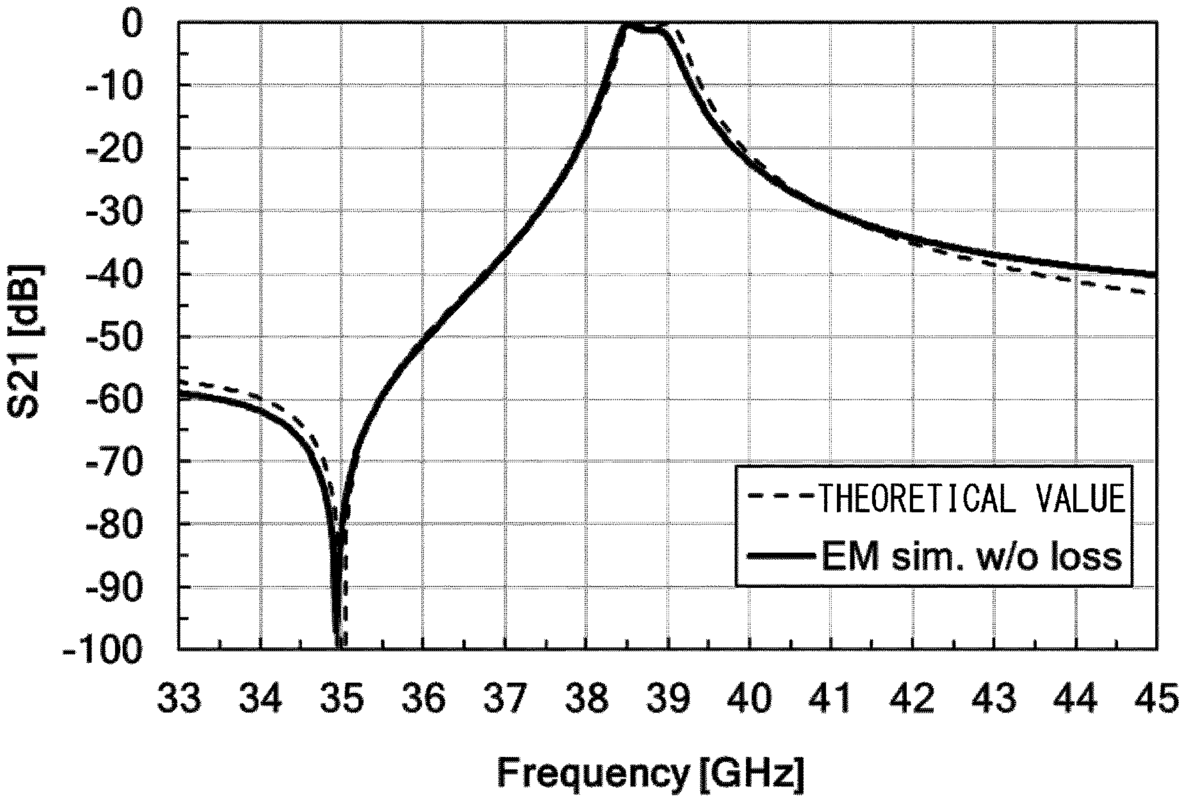
FIG. 12 is a diagram showing a result of a comparison between filter characteristics according to the second example embodiment of the present disclosure and the result of the simulation.

FIG. 12 shows an analytical solution and dielectric loss by a theoretical formula of the (1+1)-order generalized Chebyshev bandpass filter and transmission characteristics of the electromagnetic field simulation when the conduction loss is ideally set to zero. The frequency of the transmission zero point is set to 35 GHz like in the case of FIG. 11. Since the two graphs are generally match each other, it can be said that characteristic almost as designed can be achieved.

Figure 13:
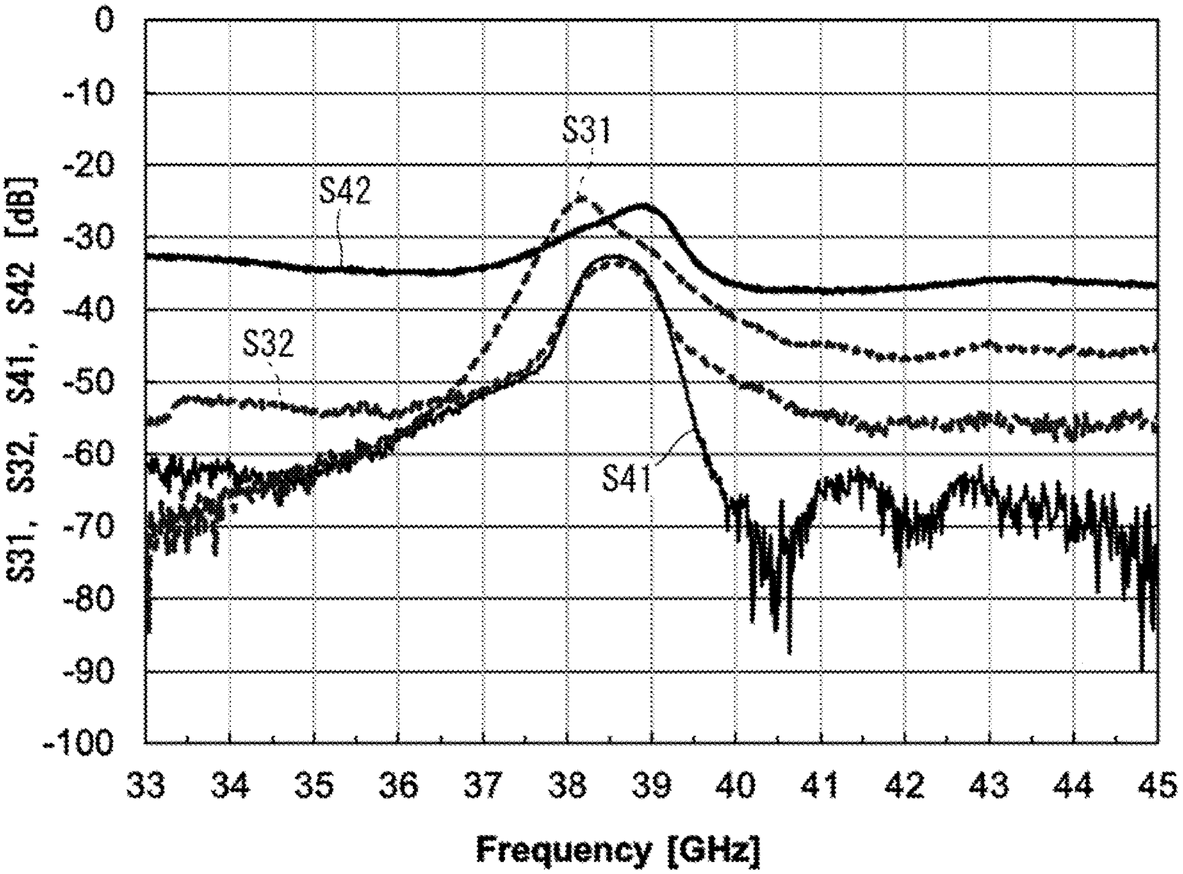
FIG. 13 is a diagram showing a result of a simulation of isolation characteristics between ports of a filter according to the second example embodiment of the present disclosure.

FIG. 13 is a diagram showing a result of an electromagnetic field simulation of isolation characteristics between ports of a filter for each signal line according to this example embodiment. Since the unnecessary isolation between ports having transmission coefficients S31, S32, S41, and S42 other than the main paths of S21 and S43 is maintained at 20 dB or greater, it can be said that independent operations can be achieved in each main signal path.

Note that, in this example embodiment, since the structure of the filter when two excitation modes (electromagnetic field eigenmodes) perpendicular to each other are used is described, the number of ports is set to four. However, when a plurality of N (N: natural number) excitation modes perpendicular to each other can be used, the number of ports may be set to 2N.

As described above, in this example embodiment, excitation modes that are different in accordance with signals and perpendicular to each other are used for excitation, and paths of two signals, such as two types of polarization signals, are respectively assigned to the excitation modes. Then, by achieving coupling between resonators, it is possible to achieve two independent filter characteristics while sharing the resonator housing.

According to the present disclosure, it is possible to provide a filter and an antenna module which enable the number of filters mounted between wires from a plurality of transmission/reception units to respective feeding points of a polarization shared planar antenna to be reduced.

<Third Example Embodiment>

Figure 14:
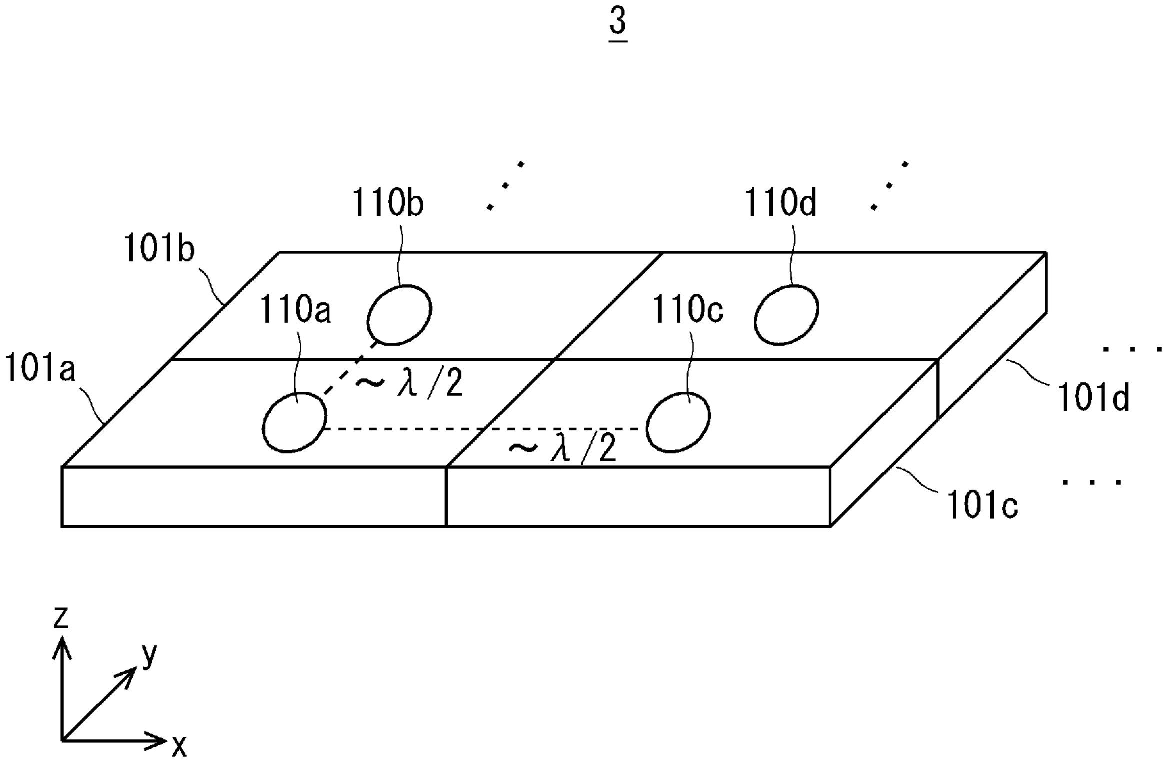
FIG. 14 is a configuration diagram of an antenna module according to a third example embodiment of the present disclosure.

The antenna module 3 according to this example embodiment will be described with reference to FIG. 14. FIG. 14 is a configuration diagram of the antenna module 3 according to this example embodiment. In the antenna module 3 shown in FIG. 14, a plurality of antennas 110*b*, 110*c*, and 110*d*, which are identical to an antenna 110*a* as an antenna element of two types of polarizations, are formed on an array at about half the wavelength of a carrier wave. Note that λ in FIG. 14 indicates the wavelength of the carrier wave. In FIG. 14, the feed line 130 and the like are omitted for the sake of simplification of the drawing.

In FIG. 14, four antennas, i.e., the antennas 110*a* to 110*d*, are provided. However, any number of antennas can be provided if it is an appropriate value in accordance with desired characteristics such as a beam width of a carrier wave.

On the lower surfaces of the antennas 110*a* to 110*d*, a plurality of resonators 101*a* to 101*d* composing the filter 100 described in the second example embodiment are provided as a resonator group. That is, a design is performed so that two excitation modes perpendicular to each other are excited in the resonator group of the filter 100 and the excitation modes are used for signal transmission of two types of polarization signals, respectively. Note that, in this example embodiment, although it is assumed that the resonator group includes the four resonators 101*a* to 101*d*, any number of resonators can be set if it is an appropriate value in accordance with desired characteristics such as a beam width.

As exemplified in the second example embodiment, when the length of each side of the rectangular part in the substrate plane of the square resonator group is set to be less than or equal to λ/2, the same filter housing can be shared, a high isolation can be maintained for each polarization signal, and an independent signal transmission can be performed. Therefore, it is possible to reduce the size of the filter, and mount the filter of a small size on the array immediately below the antenna array of two types of polarizations as well as the antenna element.

Note that the present disclosure is not limited to the above-described example embodiments and may be changed as appropriate without departing from the scope and spirit of the present disclosure.

The whole or part of the example embodiments disclosed above can be described as, but not limited to, the following supplementary notes.

(Supplementary Note 1)

A filter comprising:

an input unit connected to an antenna, the input unit being configured to input a first polarization signal and a second polarization signal that are input from the antenna;

an output unit configured to output a first output signal corresponding to the first polarization signal and a second output signal corresponding to the second polarization signal, the first and the second output signals having been subjected to filter processing for making a desired frequency electric signal of each of the first and the second polarization signals pass through the first and the second output signals, respectively; and a resonator group comprising a plurality of resonators, wherein the resonator group excites a first excitation mode and a second excitation mode perpendicular to each other by the input first and second polarization signals, whereby the output unit outputs the first and the second output signals corresponding to the first and second polarization signals, respectively.

(Supplementary Note 2)

The filter according to Supplementary note 1, wherein the input unit comprises a first port for inputting the first polarization signal and a second port for inputting the second polarization signal, and the output unit comprises a third port for outputting the first output signal corresponding to the first polarization signal and a fourth port for outputting the second output signal corresponding to the second polarization signal.

(Supplementary Note 3)

The filter according to Supplementary note 1 or 2, wherein the resonator group comprises a first resonator connected to the input unit and a second resonator connected to the output unit.

(Supplementary Note 4)

The filter according to Supplementary note 3, wherein the first resonator comprises:

a rectangular first slot opening;

a rectangular second slot opening, a long side of the second slot opening being perpendicular to a long side of the first slot opening;

a first feeder configured to propagate the first polarization signal, the first feeder being electromagnetically coupled to the first slot opening; and a second feeder configured to propagate the second polarization signal, the second feeder being electromagnetically coupled to the second slot opening.

(Supplementary Note 5)

The filter according to Supplementary note 3 or 4, wherein the second resonator comprises:

a rectangular third slot opening;

a rectangular fourth slot opening, a long side of the fourth slot opening being perpendicular to a long side of the third slot opening;

a third feeder configured to propagate an output signal corresponding to the first polarization signal, the third feeder being electromagnetically coupled to the third slot opening; and a fourth feeder configured to propagate an output signal corresponding to the second polarization signal, the fourth feeder being electromagnetically coupled to the fourth slot opening.

(Supplementary Note 6)

The filter according to any one of Supplementary notes 3 to 5, wherein the first resonator is electromagnetically coupled in series to the second resonator.

(Supplementary Note 7)

The filter according to Supplementary note 6, wherein the series coupling has a frequency dependence and at least one transmission zero point for a frequency of each of the first and the second polarization signals.

(Supplementary Note 8)

The filter according to any one of Supplementary notes 1 to 7, wherein the first excitation mode is a TE 210 mode and the second excitation mode is a TE 120 mode.

(Supplementary Note 9)

The filter according to any one of Supplementary notes 1 to 8, wherein the resonator group uses a via hole array formed on a laminated substrate as an electrical boundary wall.

(Supplementary Mote 10)

The filter according to any one of Supplementary notes 1 to 9, wherein the first polarization signal is a horizontal polarization and the second polarization signal is a vertical polarization.

(Supplementary Note 11)

The filter according to any one of Supplementary notes 1 to 10, wherein the output unit is connected to a Low Noise Amplifier (LNA).

(Supplementary Note 12)

An antenna module comprising a filter and a polarization antenna, the filter comprising:

an input unit connected to an antenna, the input unit being configured to input a first polarization signal and a second polarization signal that are input from the antenna;

an output unit configured to output a first output signal corresponding to the first polarization signal and a second output signal corresponding to the second polarization signal, the first and the second output signals having been subjected to filter processing for making a desired frequency electric signal of each of the first and the second polarization signals pass through the first and the second output signals, respectively; and a resonator group comprising a plurality of resonators, wherein the resonator group excites a first excitation mode and a second excitation mode perpendicular to each other by the input first and second polarization signals, whereby the output unit outputs the first and the second output signals corresponding to the first and second polarization signals, respectively.

(Supplementary Note 13)

The antenna module according to Supplementary note 12, wherein the input unit comprises a first port for inputting the first polarization signal and a second port for inputting the second polarization signal, and the output unit comprises a third port for outputting the first output signal corresponding to the first polarization signal and a fourth port for outputting the second output signal corresponding to the second polarization signal.

(Supplementary Note 14)

The antenna module according to Supplementary note 12 or 13, wherein the resonator group comprises a first resonator connected to the input unit and a second resonator connected to the output unit.

(Supplementary Note 15)

The antenna module according to Supplementary note 14, wherein the first resonator comprises:

a rectangular first slot opening;

a rectangular second slot opening, a long side of the second slot opening being perpendicular to a long side of the first slot opening;

a first feeder configured to propagate the first polarization signal, the first feeder being electromagnetically coupled to the first slot opening; and a second feeder configured to propagate the second polarization signal, the second feeder being electromagnetically coupled to the second slot opening.

(Supplementary Note 16)

The antenna module according to Supplementary note 14 or 15, wherein the second resonator comprises:

a rectangular third slot opening;

a rectangular fourth slot opening, a long side of the fourth slot opening being perpendicular to a long side of the third slot opening;

a third feeder configured to propagate an output signal corresponding to the first polarization signal, the third feeder being electromagnetically coupled to the third slot opening; and a fourth feeder configured to propagate an output signal corresponding to the second polarization signal, the fourth feeder being electromagnetically coupled to the fourth slot opening.

(Supplementary Note 17)

The antenna module according to any one of Supplementary notes 14 to 16, wherein the first resonator is electromagnetically coupled in series to the second resonator.

(Supplementary Note 18)

The antenna module according to Supplementary note 17, wherein the series coupling has a frequency dependence and at least one transmission zero point for a frequency of each of the first and the second polarization signals.

(Supplementary Note 19)

The antenna module according to any one of Supplementary notes 12 to 18, wherein the first excitation mode is a TE 210 mode and the second excitation mode is a TE 120 mode.

(Supplementary Note 20)

The antenna module according to any one of Supplementary notes 12 to 19, wherein the resonator group uses a via hole array formed on a laminated substrate as an electrical boundary wall.

(Supplementary Note 21)

The antenna module according to any one of Supplementary notes 12 to 20, wherein the first polarization signal is a horizontal polarization and the second polarization signal is a vertical polarization.

(Supplementary Note 22)

The antenna module according to any one of Supplementary notes 12 to 21, wherein the output unit is connected to a Low Noise Amplifier (LNA).

Although the present invention has been described above with reference to example embodiments, the present invention is not limited to the above-described example embodiments. Various changes that can be understood by those skilled in the art can be made to the configuration and details of the present invention within the scope of the invention.

This application is based upon and claims the benefit of priority from Japanese patent application No. 2021-016337, filed on Feb. 4, 2021, the disclosure of which is incorporated herein in its entirety by reference.

REFERENCE SIGNS LIST

100 FILTER
2, 110, 110*a*, 110*b*, 110*c*, 110*d* ANTENNA
3 ANTENNA MODULE
10 INPUT UNIT
20 OUTPUT UNIT
30 RESONATOR GROUP
101, 101*a*, 101*b*, 101*c*, 101*d*, 102 RESONATOR
120*a*, 120*b* PA
121*a*, 121*b* LNA
130*a*, 130*b*, 131*a*, 131*b* FEEDER
140*a*, 140*b*, WIRING LAYER
150*a*, 150*b*, 151*a*, 151*b*, 152*a*, 152*b*, 153*a*, 153*b* SLOT OPENING
201, 202 MAGNETIC FIELD VECTOR
203, 204 ELECTRIC FIELD VECTOR

What is claimed is:

1. A filter comprising:

at least one input port connected to an antenna, the at least one input port being configured to input a first polarization signal and a second polarization signal that are input from the antenna;

at least one output port for outputting a first output signal corresponding to the first polarization signal and a second output signal corresponding to the second polarization signal, the first and the second output signals having been subjected to filter processing for making a desired frequency electric signal of each of the first and the second polarization signals pass through the first and the second output signals, respectively; and a resonator group comprising a plurality of resonators, wherein the resonator group excites a first excitation mode and a second excitation mode perpendicular to each other by the input first and second polarization signals, whereby the at least one output port outputs the first and the second output signals corresponding to the first and second polarization signals, respectively, wherein the resonator group comprises a first resonator connected to the at least one input port and a second resonator connected to the at least one output port, and wherein the first resonator comprises:

a rectangular first slot opening;

a rectangular second slot opening, a long side of the second slot opening being perpendicular to a long side of the first slot opening;

a first feeder configured to propagate the first polarization signal, the first feeder being electromagnetically coupled to the first slot opening; and a second feeder configured to propagate the second polarization signal, the second feeder being electromagnetically coupled to the second slot opening.

2. The filter according to claim 1, wherein the at least one input port comprises a first port for inputting the first polarization signal and a second port for inputting the second polarization signal, and the at least one output port comprises a third port for outputting the first output signal corresponding to the first polarization signal and a fourth port for outputting the second output signal corresponding to the second polarization signal.

3. The filter according to claim 1, wherein the second resonator comprises:

a rectangular third slot opening;

a rectangular fourth slot opening, a long side of the fourth slot opening being perpendicular to a long side of the third slot opening;

a third feeder configured to propagate an output signal corresponding to the first polarization signal, the third feeder being electromagnetically coupled to the third slot opening; and a fourth feeder configured to propagate an output signal corresponding to the second polarization signal, the fourth feeder being electromagnetically coupled to the fourth slot opening.

4. The filter according to claim 1, wherein the first resonator is electromagnetically coupled in series to the second resonator.

5. The filter according to claim 4, wherein the series coupling has a frequency dependence and at least one transmission zero point for a frequency of each of the first and the second polarization signals.

6. The filter according to claim 1, wherein the first excitation mode is a TE 210 mode and the second excitation mode is a TE 120 mode.

7. The filter according to claim 1, wherein the resonator group uses a via hole array formed on a laminated substrate as an electrical boundary wall.

8. The filter according to claim 1, wherein the first polarization signal is a horizontal polarization and the second polarization signal is a vertical polarization.

9. An antenna module comprising a filter and a polarization antenna, the filter comprising:

at least one input port connected to an antenna, the at least one input port being configured to input a first polarization signal and a second polarization signal that are input from the antenna;

at least one output port for outputting a first output signal corresponding to the first polarization signal and a second output signal corresponding to the second polarization signal, the first and the second output signals having been subjected to filter processing for making a desired frequency electric signal of each of the first and the second polarization signals pass through the first and the second output signals, respectively; and a resonator group comprising a plurality of resonators, wherein the resonator group excites a first excitation mode and a second excitation mode perpendicular to each other by the input first and second polarization signals, whereby the at least one output port outputs the first and the second output signals corresponding to the first and second polarization signals, respectively, wherein the resonator group comprises a first resonator connected to the at least one input port and a second resonator connected to the at least one output port, and wherein the first resonator comprises:

a rectangular first slot opening;

a rectangular second slot opening, a long side of the second slot opening being perpendicular to a long side of the first slot opening;

a first feeder configured to propagate the first polarization signal, the first feeder being electromagnetically coupled to the first slot opening; and a second feeder configured to propagate the second polarization signal, the second feeder being electromagnetically coupled to the second slot opening.

10. The antenna module according to claim 9, wherein the at least one input port comprises a first port for inputting the first polarization signal and a second port for inputting the second polarization signal, and the at least one output port comprises a third port for outputting the first output signal corresponding to the first polarization signal and a fourth port for outputting the second output signal corresponding to the second polarization signal.

11. The antenna module according to claim 9, wherein the second resonator comprises:

a rectangular third slot opening;

a rectangular fourth slot opening, a long side of the fourth slot opening being perpendicular to a long side of the third slot opening;

a third feeder configured to propagate an output signal corresponding to the first polarization signal, the third feeder being electromagnetically coupled to the third slot opening; and a fourth feeder configured to propagate an output signal corresponding to the second polarization signal, the fourth feeder being electromagnetically coupled to the fourth slot opening.

12. The antenna module according to claim 9, wherein the first resonator is electromagnetically coupled in series to the second resonator.

13. The antenna module according to claim 12, wherein the series coupling has a frequency dependence and at least one transmission zero point for a frequency of each of the first and the second polarization signals.

14. The antenna module according to claim 9, wherein the first excitation mode is a TE 210 mode and the second excitation mode is a TE 120 mode.

15. The antenna module according to claim 9, wherein the resonator group uses a via hole array formed on a laminated substrate as an electrical boundary wall.

16. The antenna module according to claim 9, wherein the first polarization signal is a horizontal polarization and the second polarization signal is a vertical polarization.

17. A filter comprising:

at least one input port connected to an antenna, the at least one input port being configured to input a first polarization signal and a second polarization signal that are input from the antenna;

at least one output port for outputting a first output signal corresponding to the first polarization signal and a second output signal corresponding to the second polarization signal, the first and the second output signals having been subjected to filter processing for making a desired frequency electric signal of each of the first and the second polarization signals pass through the first and the second output signals, respectively; and a resonator group comprising a plurality of resonators, wherein the resonator group excites a first excitation mode and a second excitation mode perpendicular to each other by the input first and second polarization signals, whereby the at least one output port outputs the first and the second output signals corresponding to the first and second polarization signals, respectively, wherein the resonator group uses a via hole array formed on a laminated substrate as an electrical boundary wall.

* * * * *